United States Patent
Kimura

(10) Patent No.: US 7,934,157 B2
(45) Date of Patent: Apr. 26, 2011

(54) UTILIZATION OF TREE VIEW FOR PRINTING DATA

(75) Inventor: Mitsuo Kimura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1022 days.

(21) Appl. No.: 11/565,912

(22) Filed: Dec. 1, 2006

(65) Prior Publication Data

US 2007/0130178 A1 Jun. 7, 2007

(30) Foreign Application Priority Data

Dec. 6, 2005 (JP) ................................. 2005-352335

(51) Int. Cl.
G06F 17/00 (2006.01)
(52) U.S. Cl. .......................... 715/274; 715/224; 715/853
(58) Field of Classification Search .................. 715/224, 715/225, 226, 274, 853
See application file for complete search history.

(56) References Cited

U.S. PATENT DOCUMENTS

| | | | | |
|---|---|---|---|---|
| 5,442,784 A * | 8/1995 | Powers et al. | ................. | 707/102 |
| 5,644,776 A * | 7/1997 | DeRose et al. | ................. | 715/234 |
| 5,701,453 A * | 12/1997 | Maloney et al. | ............. | 707/714 |
| 5,842,218 A * | 11/1998 | Robinson | ............................. | 1/1 |
| 6,380,947 B1 * | 4/2002 | Stead | ........................... | 345/645 |
| 6,670,973 B1 * | 12/2003 | Hill et al. | ....................... | 715/234 |
| 6,727,927 B1 * | 4/2004 | Dempski et al. | ............. | 715/853 |
| 6,826,727 B1 * | 11/2004 | Mohr et al. | ................... | 715/235 |
| 7,039,863 B1 * | 5/2006 | Caro et al. | ..................... | 715/209 |
| 7,143,086 B2 | 11/2006 | Miyamoto et al. | | |
| 7,158,981 B2 * | 1/2007 | Agarwal et al. | ............... | 707/100 |
| 7,475,333 B2 * | 1/2009 | Otter et al. | ..................... | 715/222 |
| 7,689,933 B1 * | 3/2010 | Parsons | ......................... | 715/838 |
| 2003/0101171 A1 * | 5/2003 | Miyamoto et al. | ................ | 707/3 |
| 2003/0218640 A1 * | 11/2003 | Noble-Thomas | ............. | 345/853 |
| 2004/0189716 A1 * | 9/2004 | Paoli et al. | ..................... | 345/853 |
| 2005/0094207 A1 * | 5/2005 | Lo et al. | ........................ | 358/1.18 |
| 2006/0028659 A1 * | 2/2006 | Nishikawa | ..................... | 358/1.2 |
| 2006/0170948 A1 * | 8/2006 | Kobashi | ....................... | 358/1.13 |
| 2007/0050697 A1 * | 3/2007 | Lewis-Bowen et al. | ...... | 715/503 |
| 2008/0155394 A1 * | 6/2008 | Sellman et al. | ............... | 715/235 |

FOREIGN PATENT DOCUMENTS

| | | |
|---|---|---|
| JP | 11-161726 A | 6/1999 |
| JP | 2003-162545 A | 6/2003 |
| JP | 2004-252725 A | 9/2004 |

OTHER PUBLICATIONS

Office action issued in coresponding Japanese patent application No. 2005-352335, dated Oct. 24, 2008.

* cited by examiner

Primary Examiner — Stephen S Hong
Assistant Examiner — Tyler J Schallhorn
(74) Attorney, Agent, or Firm — Rossi, Kimms & McDowell LLP

(57) ABSTRACT

An information processing apparatus for generating, on the basis of specific data containing a plurality of record data, print data to be processed by a printing apparatus, includes a tree view display unit adapted to display, when record data in a specific field contained in the specific data changes, a tree view that contains the record data before change and the record data after change as nodes of the same layer, and an acquisition unit adapted to acquire data corresponding to a node selected from the tree view.

16 Claims, 13 Drawing Sheets

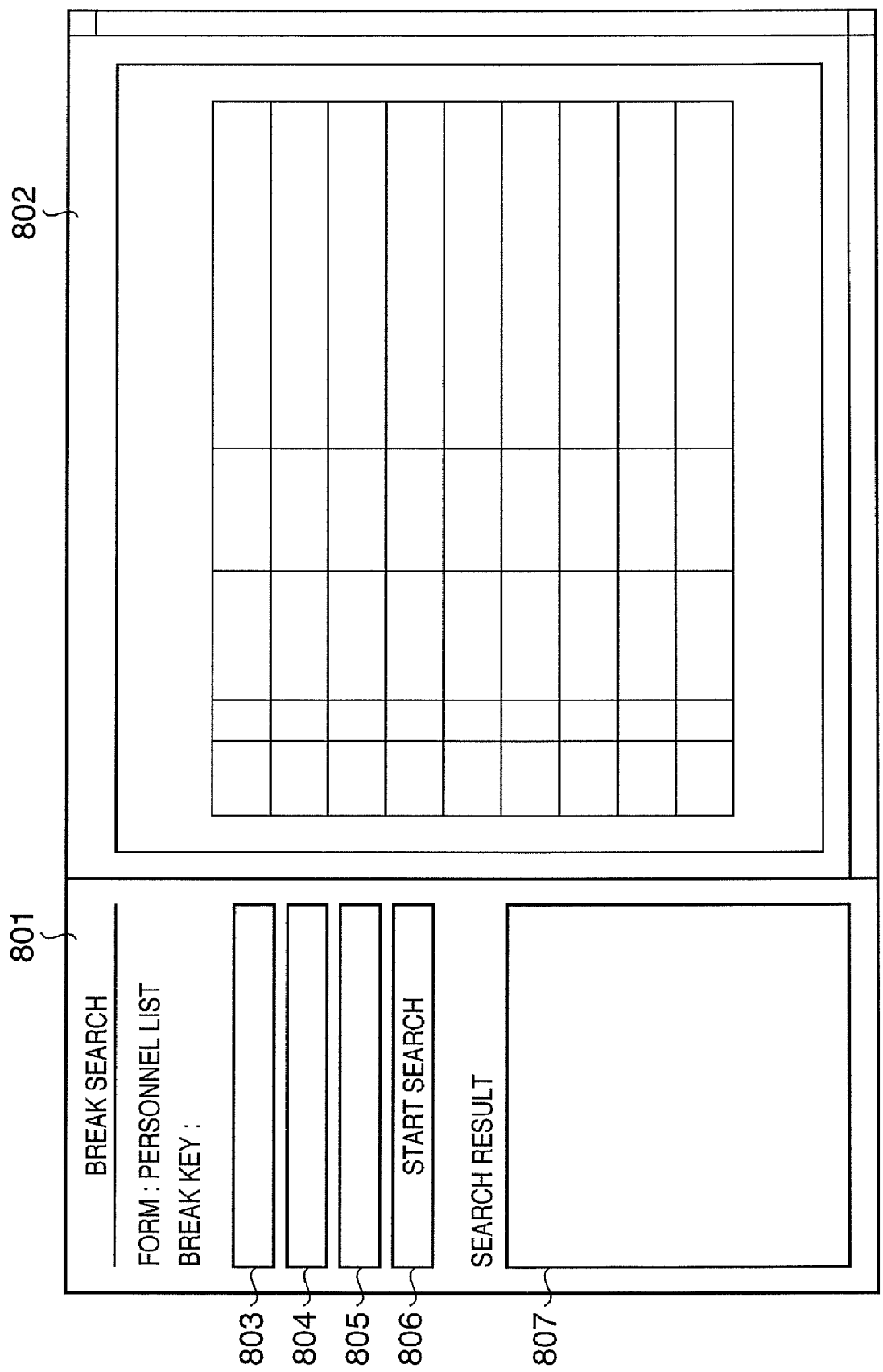

FIG. 9A

801 — BREAK SEARCH
FORM : PERSONNEL LIST
BREAK KEY
803 — BRANCH NAME
804 — DEPARTMENT NAME
805 — SECTION NAME
806 — START SEARCH
807 — SEARCH RESULT

- ☐ OSAKA BRANCH
  - ☐ BUSINESS DEPARTMENT
    - ■ FIRST SECTION
    - ☐ SECOND SECTION
  - ☐ PLANNING DEPARTMENT
    - ☐ FIRST SECTION
    - ☐ SECOND SECTION
- ☐ TOKYO HEADQUARTER
  - ☐ ACCOUNTING DEPARTMENT
    - ☐ ACCOUNTING SECTION
  - ☐ GENERAL AFFAIRS DEPARTMENT
    - ☐ GENERAL AFFAIRS SECTION 604, 606

FIG. 9B

PRINT
PREVIEW FIRST PAGE
PREVIEW LAST PAGE

901

UTILIZATION OF TREE VIEW FOR PRINTING DATA

BACKGROUND OF THE INVENTION

1. Field of the Invention

The present invention relates to an information processing technique related to display and printing of form data.

2. Description of the Related Art

There is a technique of storing format data in a nonvolatile memory, executing form overlay processing using the format data and form data, and printing the result. In form data, data of a plurality of categories are internally divided into fields and stored.

A user who wants to preview or print a specific page must search for desired data by character string in each field of form data.

Japanese Patent Laid-Open No. 2004-252725 discloses a technique of visualizing a data structure by displaying a tree view.

The technique of Japanese Patent Laid-Open No. 2004-252725 acquires information of chapters contained in document data and hierarchically displays the document structure. However, this technique does not allow for searches in each field of form data.

To preview a form data search result and then preview another page (field) or designate the print range, the user must execute a search again by designating a character string serving as a search key in each field.

The operation of designating a character string again and searching a large quantity of form data to specify the data desired by the user is cumbersome. Searching for desired data (preview data or print data) requires the user to do an operation with poor operability in a search and print range setting and poor search result recognizability.

SUMMARY OF THE INVENTION

It is an object of the present invention to provide an information processing technique capable of searching for desired preview data and print data by an operation with excellent operability in print range setting and excellent search result recognizability.

According to the present invention, the foregoing object is attained by providing an information processing apparatus for generating, on the basis of specific data containing a plurality of record data, print data to be processed by a printing apparatus, comprising:

a tree view display unit adapted to display, when record data in a specific field contained in the specific data changes, a tree view that contains the record data before change and the record data after change as nodes of the same layer; and an acquisition unit adapted to acquire data corresponding to a node selected from the tree view.

According to another aspect of the present invention, the foregoing object is attained by providing an information processing method of generating, on the basis of specific data containing a plurality of record data, print data to be processed by a printing apparatus, comprising:

a tree view display step of displaying, when record data in a specific field contained in the specific data changes, a tree view that contains the record data before change and the record data after change as nodes of the same layer; and an acquisition step of acquiring data corresponding to a node selected from the tree view.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view illustrating a preview display window displayed on the screen of the client terminal;

FIGS. 9A and 9B are views illustrating a break position search result;

DESCRIPTION OF THE EMBODIMENTS

Embodiments of the present invention will now be described in detail in accordance with the accompanying drawings.

Figure 1:
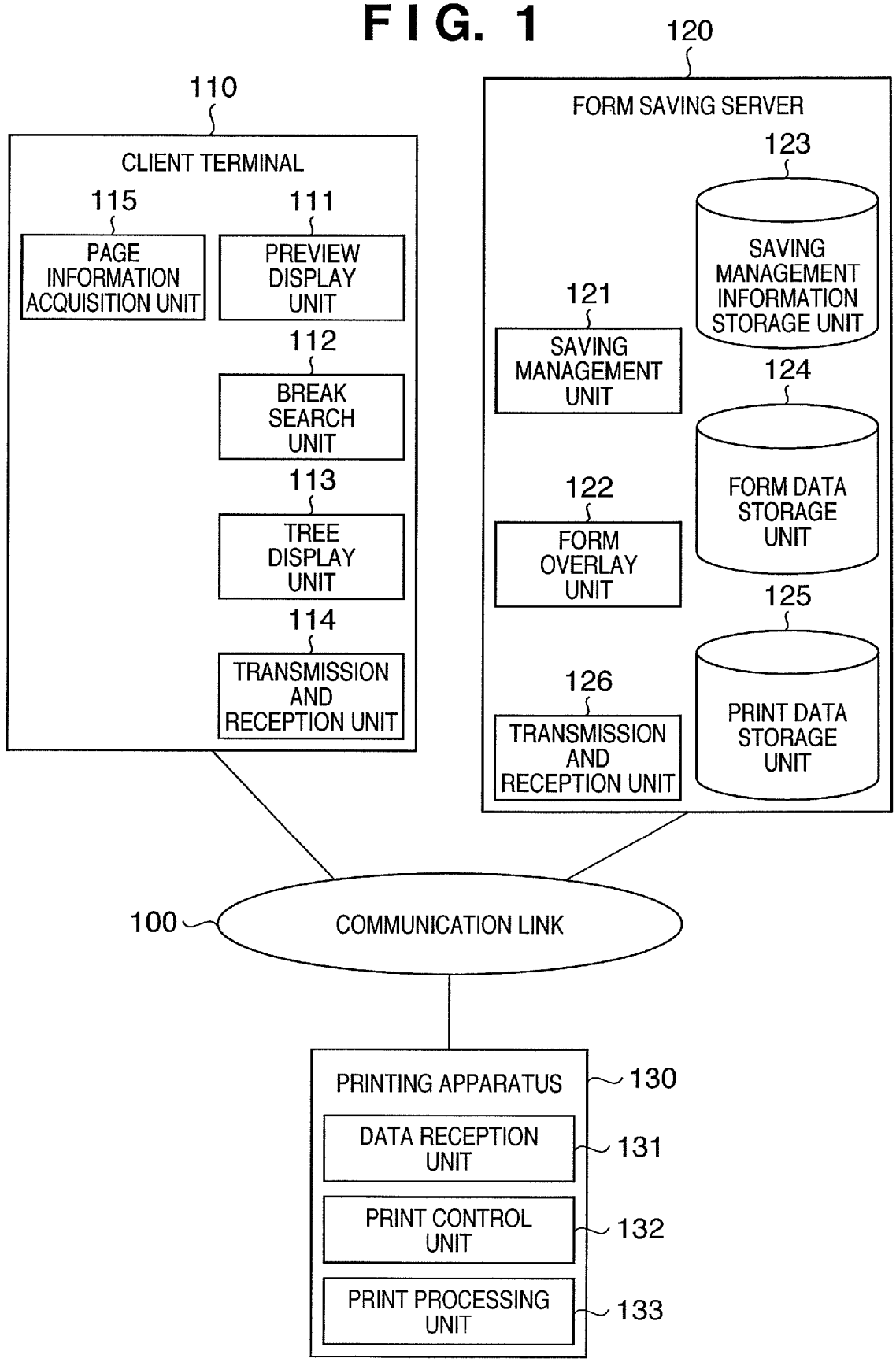
FIG. 1 is a view showing the overall arrangement of a form printing system according to an embodiment of the present invention.

FIG. 1 is a view showing the overall arrangement of a form printing system according to an embodiment of the present invention. Referring to FIG. 1, a communication link 100 connects a client terminal 110, form saving server 120, and printing apparatus 130.

The communication link 100 is a bidirectionally communicable network which is implemented by, e.g., a LAN such as the Internet, WAN, telephone network, dedicated digital network, ATM, frame relay network, communication satellite channel, cable TV network, and data broadcast wireless network or a combination thereof. The communication link 100 needs only to be able to transmit/receive data. The communication medium from the client terminal 110 to the form saving server 120 may be different from that from the form saving server 120 to the printing apparatus 130.

The client terminal 110 includes, e.g., a desktop personal computer, notebook personal computer, mobile personal computer, or PDA (Personal Data Assistant). The client terminal 110 may be a portable phone incorporating a program function (e.g., i-mode®). The client terminal 110 comprises a preview display unit 111 that displays a preview of form data, and a break search unit 112 that searches for a break position of form data. A field designated in form data will be referred to as a break key. The position of a break key in form data will be referred to as a break position.

The client terminal 110 also comprises a tree display unit 113 that displays a tree view of a search result of break positions in form data, and a transmission and reception unit 114 that transmits/receives data through the communication link 100.

The client terminal 110 also comprises a page information acquisition unit 115 that acquires page information in form data corresponding to a node selected from a tree view displayed by the tree display unit 113. The user can specify a print range in form data on the basis of page information acquired by the page information acquisition unit 115. The user can also specify form data corresponding to the first page or last page of a node selected on the basis of page information acquired by the page information acquisition unit 115. The preview display unit 111 can display a preview of the first page or last page of a specified node.

The form saving server 120 comprises a saving management information storage unit 123 which stores saving management information, a form data storage unit 124 which stores form data, and a print data storage unit 125 which stores print data, all of which are formed by a hard disk.

The form saving server 120 also comprises a saving management unit 121 which generates saving management information, and a form overlay unit 122 which generates print data by superimposing field data onto form information contained in form data. The form overlay unit 122 generates print data by superimposing field data onto form information in a print range of form data specified on the basis of page information acquired by the page information acquisition unit 115.

The form saving server 120 also comprises a transmission and reception unit 126 which transmits/receives data through the communication link 100.

The printing apparatus 130 is a printer (e.g., laser printer or inkjet printer) connectable to the communication link 100 including a network. The printing apparatus 130 comprises a data reception unit 131 which receives data transmitted from the form saving server 120 or client terminal 110 through the communication link 100, and a print control unit 132 to print the received data. The printing apparatus 130 also comprises a print processing unit 133 to print on a sheet medium.

Figure 2:
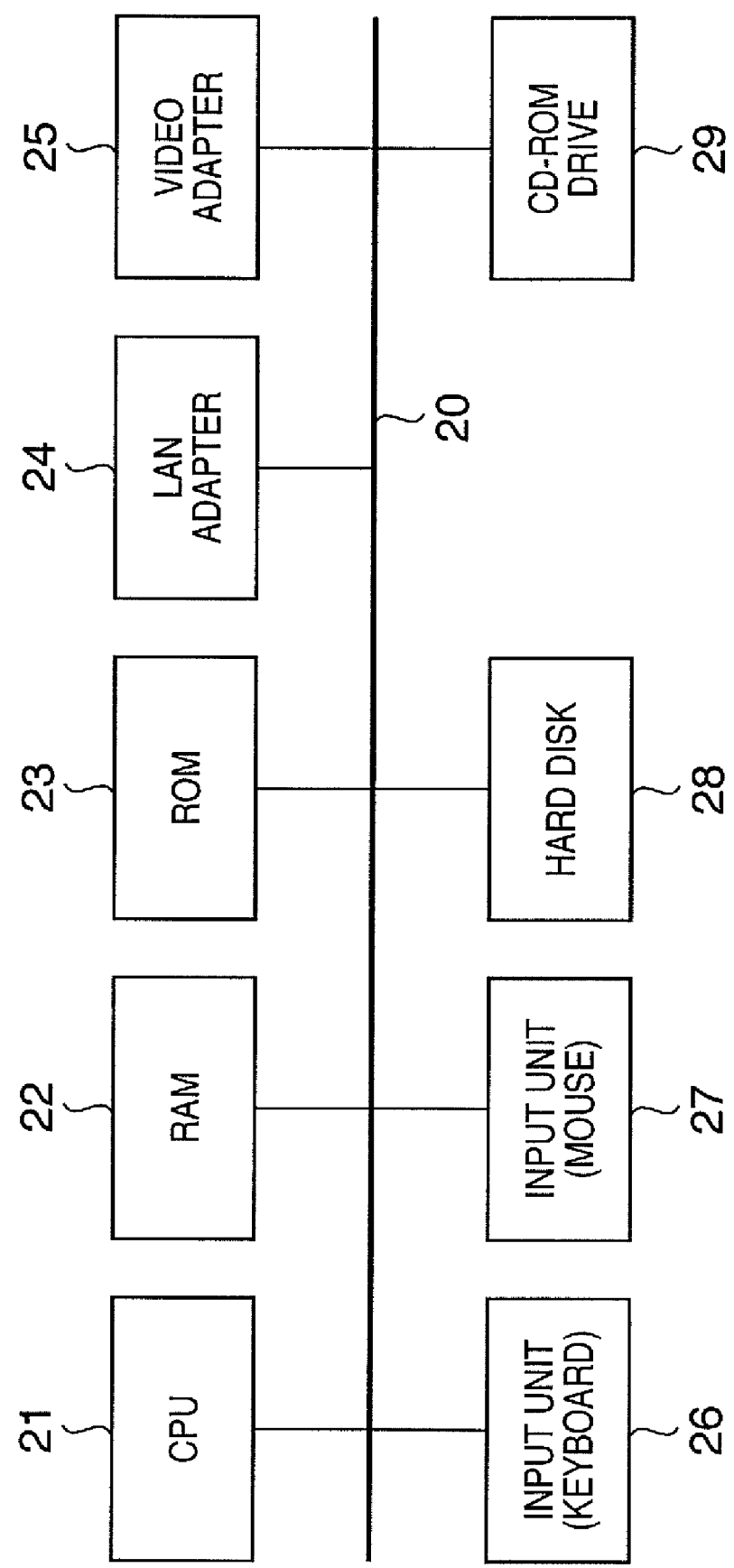
FIG. 2 is a block diagram showing the basic hardware configuration of a client terminal, form saving server, and printing apparatus in FIG. 1.

FIG. 2 is a block diagram showing a basic hardware configuration common to the client terminal 110, form saving server 120, and printing apparatus 130 in FIG. 1.

The hardware configuration includes a CPU 21, RAM 22, ROM 23, LAN adapter 24, video adapter 25, input unit (keyboard) 26, input unit (mouse) 27, hard disk 28, and CD-ROM drive 29. These constituent elements connect to each other through a system bus 20. The system bus 20 includes, e.g., a PCI bus, ASP bus, and memory bus. In the configuration shown in FIG. 2, the connection chips between the buses and keyboard interfaces, i.e., so-called input/output interfaces such as a SCSI and ATAPI are not illustrated.

The CPU 21 can execute various kinds of operations including four arithmetic operations and comparison operations based on an operating system program and application programs and control the hardware. The RAM 22 stores the operating system program and application programs which are read out from the hard disk 28 or a storage medium such as a CD-ROM or CD-R inserted into the CD-ROM drive 29. The CPU 21 can execute these programs.

The ROM 23 stores a so-called BIOS to control data input/output to/from the hard disk 28 in cooperation with the operating system. The LAN adapter 24 communicates with an external device connected through a network in cooperation with the communication program of the operating system controlled by the CPU 21.

The video adapter 25 generates an image signal to be output to a display device. A user uses the input units such as the keyboard 26 and mouse 27 to, e.g., input an instruction to an operation menu displayed on the screen of the client terminal 110 or input settings related to search and display. The hard disk 28 stores the operating system and application programs (e.g., a preview display program in the client terminal 110 and a form overlay program in the form saving server 120). The CPU 21 can execute these application programs.

The CD-ROM drive 29 is used to insert a storage medium such as a CD-ROM, CD-R, or CD-R/W and install an application program onto the hard disk 28. A CD-R drive, CD-R/W drive, or MO drive may be used in place of the CD-ROM drive.

(Print Processing)

Figure 3:
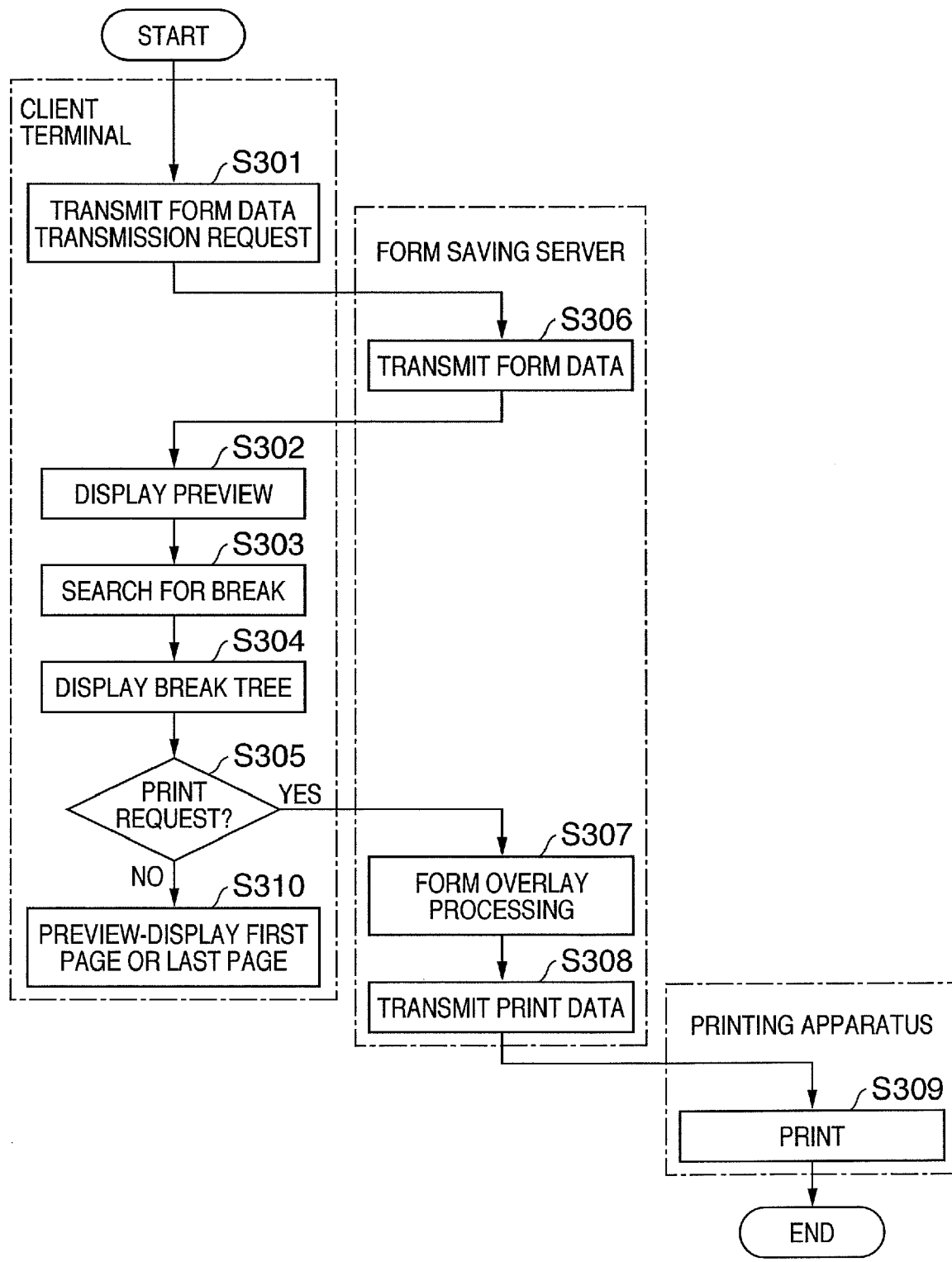
FIG. 3 is a flowchart for explaining the steps of print processing in the form printing system.

FIG. 3 is a flowchart for explaining the steps of print processing in the form printing system. In this flowchart, steps S301 to S305 and S310 are executed under the control of the client terminal 110. Steps S306 to S308 are executed under the control of the CPU of the form saving server 120. Step S309 is executed under the control of the CPU of the printing apparatus 130.

In step S301, the transmission and reception unit 114 of the client terminal 110 transmits a form data transmission request to the form saving server 120 in accordance with a user instruction.

In step S306, the form saving server 120 searches the form data storage unit 124 for the designated form data on the basis of the form data transmission request received by the transmission and reception unit 126. The form saving server 120 transmits, through the transmission and reception unit 126, the found form data to the client terminal 110 of the request source.

In step S302, the transmission and reception unit 114 of the client terminal 110 receives the form data transmitted from the form saving server 120. The RAM 22 of the client terminal 110 stores the received form data. The preview display unit 111 of the client terminal 110 executes display control on the basis of the form data to display a preview window shown in FIG. 8 on the screen of the client terminal 110.

In step S303, in accordance with a user instruction, the break search unit 112 searches for the break positions of a field designated in the preview-displayed form data.

In step S304, the tree display unit 113 displays a tree view to show the search result in step S303.

In step S305, if the client terminal 110 receives a print request for a node designated by a user instruction in the displayed tree view (YES in step S305), the client terminal 110 transmits the print request to the form saving server 120. Processing related to the print request transmission will be described later in detail with reference to FIG. 10.

In step S307, the transmission and reception unit 126 of the form saving server 120 receives the print request transmitted from the client terminal 110. The form overlay unit 122 executes form overlay processing i.e., superimposes field data on form information contained in the form data based on the print request including a page number designated as a print target, thereby generating print data.

In step S308, the transmission and reception unit 126 of the form saving server 120 transmits the generated print data to the printing apparatus 130.

In step S309, the data reception unit 131 of the printing apparatus 130 receives the print data transmitted from the form saving server 120. The RAM 22 of the printing apparatus 130 stores the print data. Print image information is generated under the control of the print control unit 132. The print processing unit 133 executes print processing.

If the user selects not the print request but the preview display of the first page or last page of the designated node in step S305 of the processing of the client terminal 110 (NO in step S305), the processing advances to step S310. Processing related to the first page or last page preview display will be described later in detail with reference to FIG. 11 or 12.

In this embodiment, the form printing system includes the client terminal 110 and form saving server 120 in separate cabinets, though they may also exist in a single cabinet. The printing apparatus may include both the client terminal 110 and the form saving server 120 or at least one of the client terminal 110 and the form saving server 120.

Figure 4:
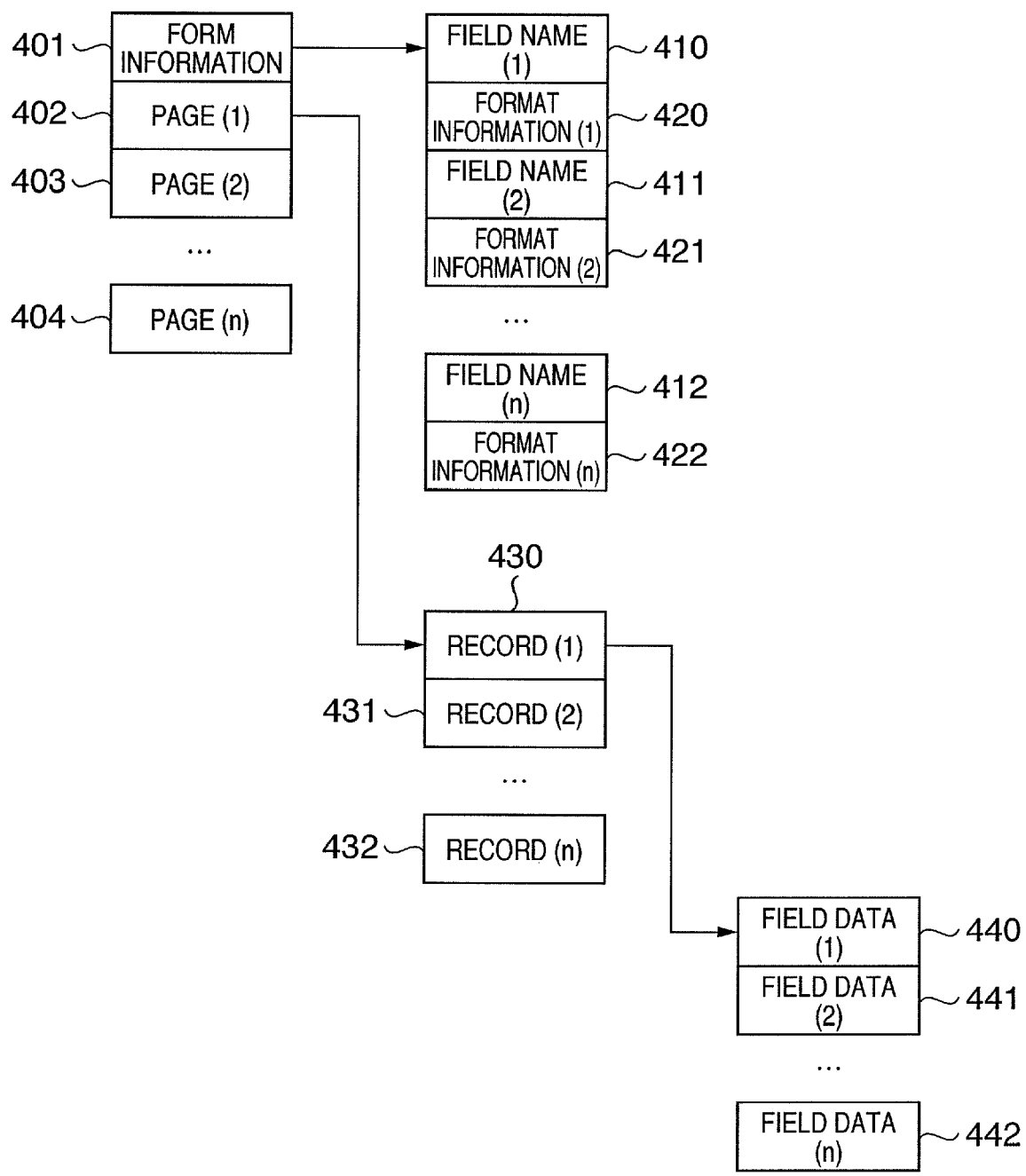
FIG. 4 is a view for explaining the structure of form data stored in a form data storage unit.

FIG. 4 is a view for explaining the data structure of form data stored in the form data storage unit 124. Form data contains form information 401 to construct the structure of a form, and a plurality of page data (402, 403, and 404) corresponding to the form information.

The form information contains a plurality of fields (410, 411, and 412) serving as conceptual boxes to insert graphic information and additional data, and a plurality of pieces of format information (420, 421, and 422) associated with the respective fields.

Each page data contains a plurality of records (430, 431, and 432). Each record contains field data (440, 441, and 442) corresponding to the plurality of fields contained in the form information.

In step S307 of FIG. 3, print data is generated by formatting field data contained in each page data in accordance with the format information of the field defined by the form information and overlaying the field data onto the form information.

(Tree View)

Figure 5A:
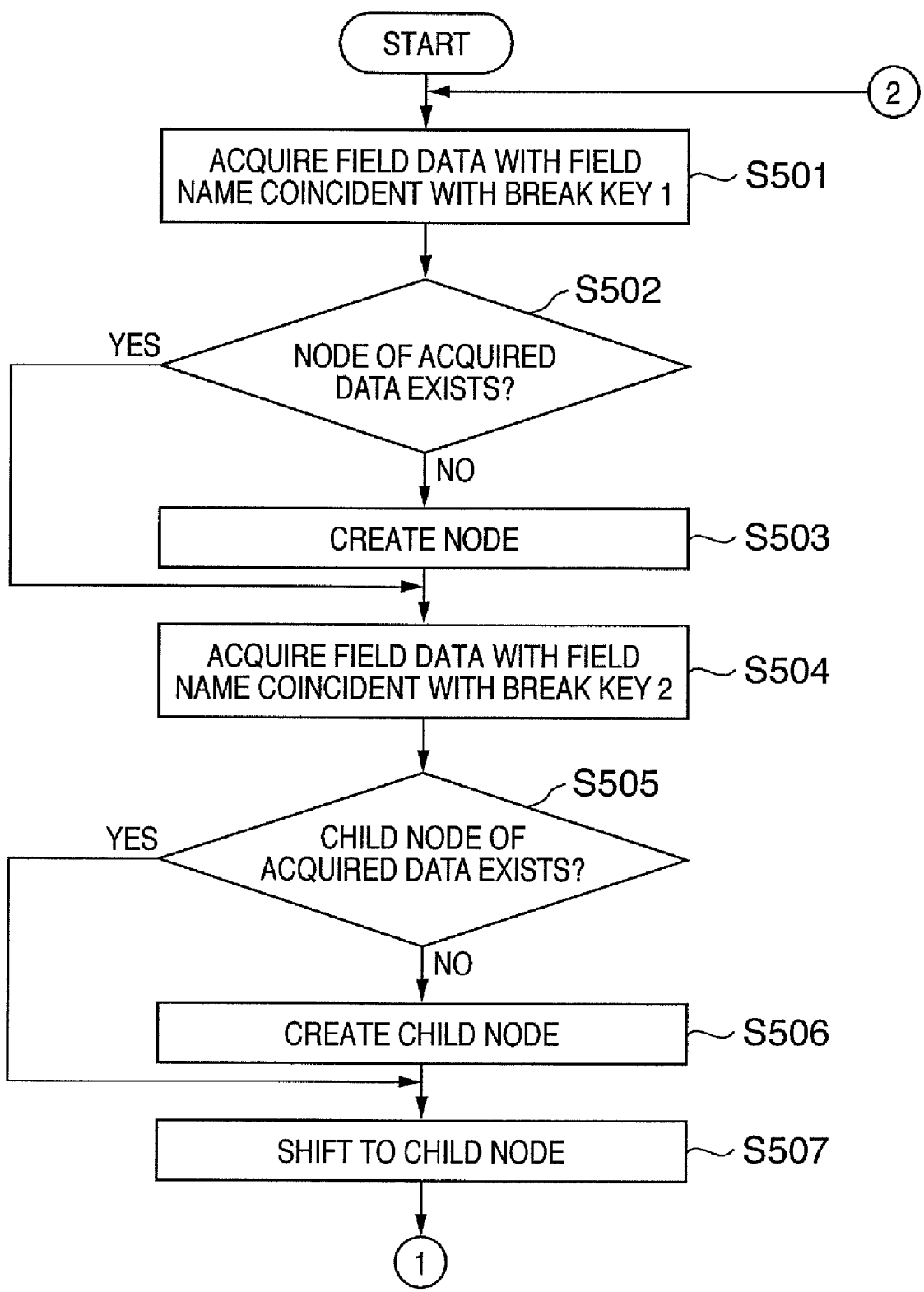
FIGS. 5A and 5B are flowcharts for explaining processing of displaying a tree view to show a search result for the positions of fields designated in preview-displayed form data.
Figure 5B:
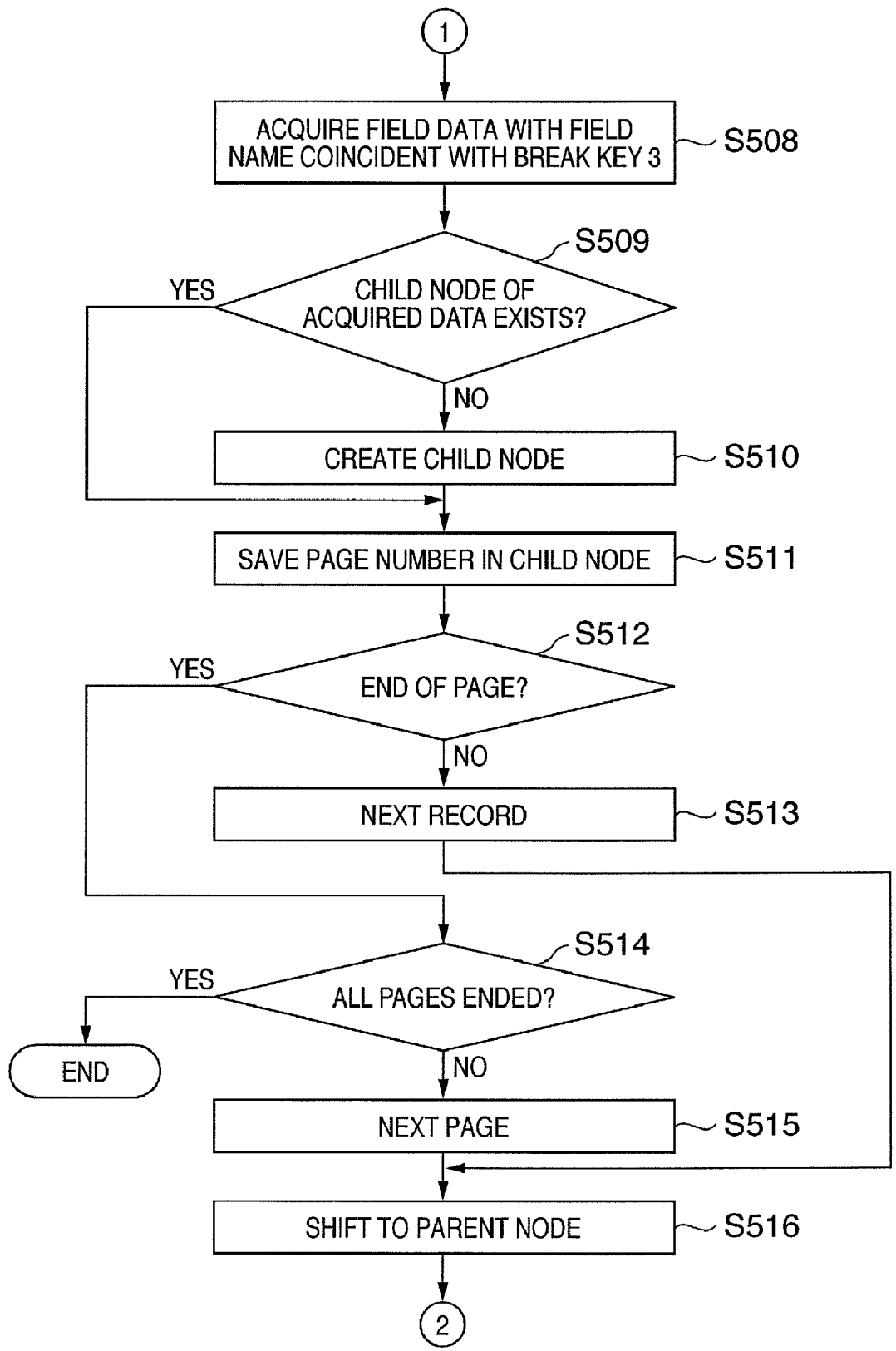

FIGS. 5A and 5B are flowcharts for explaining processing (S303 and S304) of displaying a tree view to show a search result of the positions (break positions) of fields (break keys) designated in preview-displayed form data.

Steps S501 to S516 of this flowchart are executed under the control of the CPU 21 of the client terminal 110.

In steps S501, the field data of a field that coincides with a field name designated to break key 1 (803 in FIG. 8) is acquired from a record of page data contained in form data.

In step S502, it is determined whether a tree node corresponding to the field data is present. If it is determined that no node is present (NO in step S502), a tree node corresponding to the field data acquired in step S501 is created (S503). The processing advances to step S504.

If it is determined in step S502 that a node is present (YES in step S502), the processing advances to step S504.

In step S504, the field data of a field that coincides with a field name designated to break key 2 (804 in FIG. 8) is acquired from the record of the page data contained in the form data.

In step S505, it is determined whether a node corresponding to the field data acquired in step S504 is present as a child node of the current node. If it is determined that no child node is present (NO in step S505), a child node corresponding to the field data acquired in step S504 is created (S506). The processing advances to step S507.

If it is determined in step S505 that an already created child node is present (YES in step S505), the processing advances to shifting of the child node (S507).

In step S508, the field data of a field that coincides with a field name designated to break key 3 (805 in FIG. 8) is acquired from the record of the page data contained in the form data.

In step S509, it is determined whether a node corresponding to the field data acquired in step S508 is present as a child node of the current node. If it is determined that no child node is present (NO in step S509), the processing advances to step S510 to create a child node corresponding to the field data acquired in step S508. The processing then advances to step S511.

If it is determined in step S509 that a child node is present (YES in step S509) the processing advances to step S511.

In step S511, the current page number is saved in the child node determined to exist in step S509 or the node created in step S510. In step S512, it is determined whether the current record is the last record of the page. If it is determined in step S512 that the record is not the last record of the page (NO in step S512), the processing shifts to the next record in step S513. In step S516, the processing shifts to the parent node so that the processing returns to step S501.

If it is determined in step S512 that the record is the last record of the page (YES in step S512), it is determined in step S514 whether the current page is the last page. If it is determined in step S514 that the page is the last page (YES in step S514), the processing is completed.

If it is determined in step S514 that the page is not the last page (NO in step S514), the processing shifts to the next page data in step S515. In step S516, the processing shifts to the parent node so that the processing returns to step S501. When the processing returns to step S501, the same processing from step S501 as described above is repeatedly executed until the last page (YES in step S514).

(Application Example of Form Data)

Figure 6:
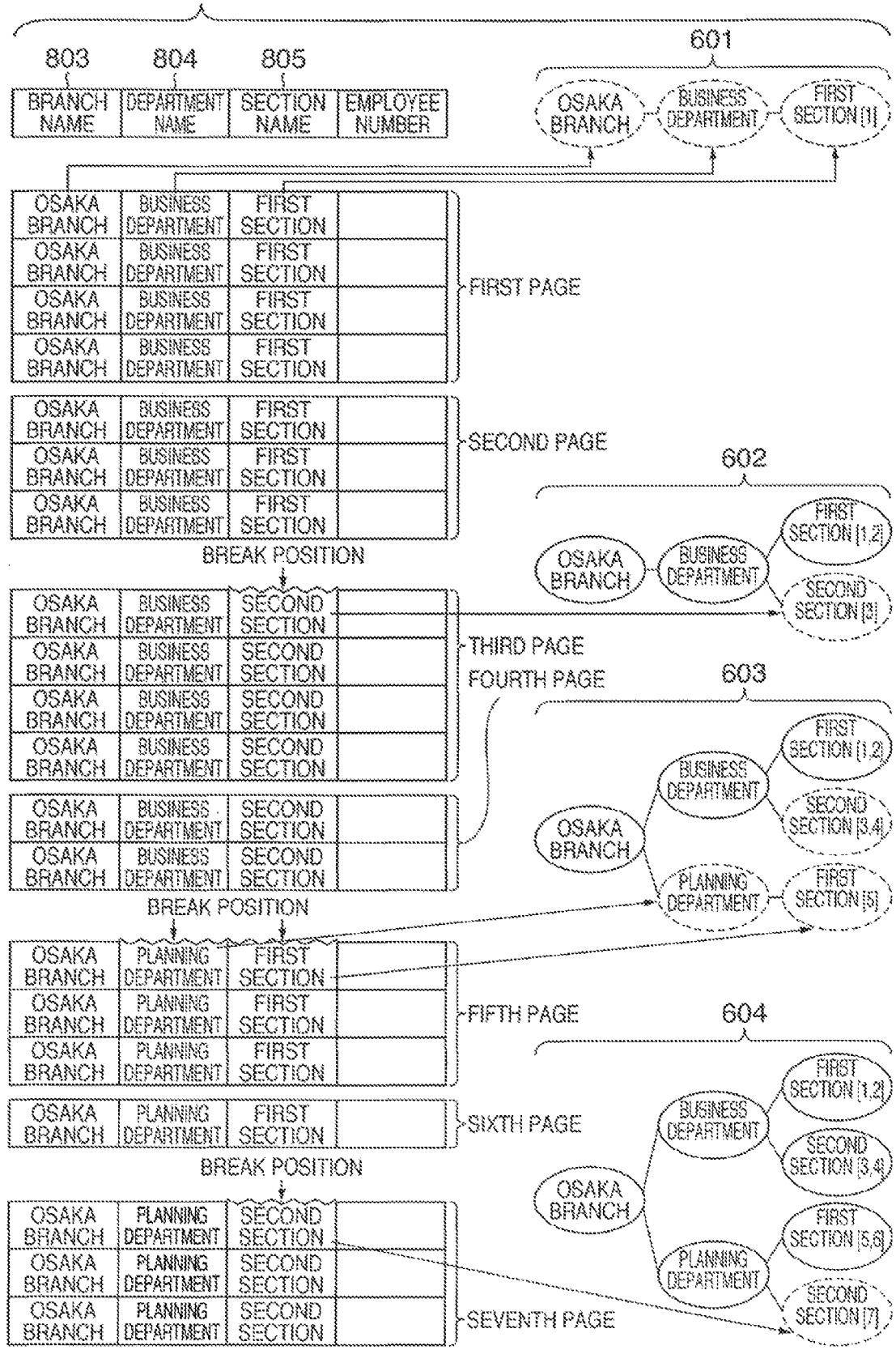
FIG. 6 is a view showing a tree view that indicates a break position search result in exemplified form data.
Figure 7:
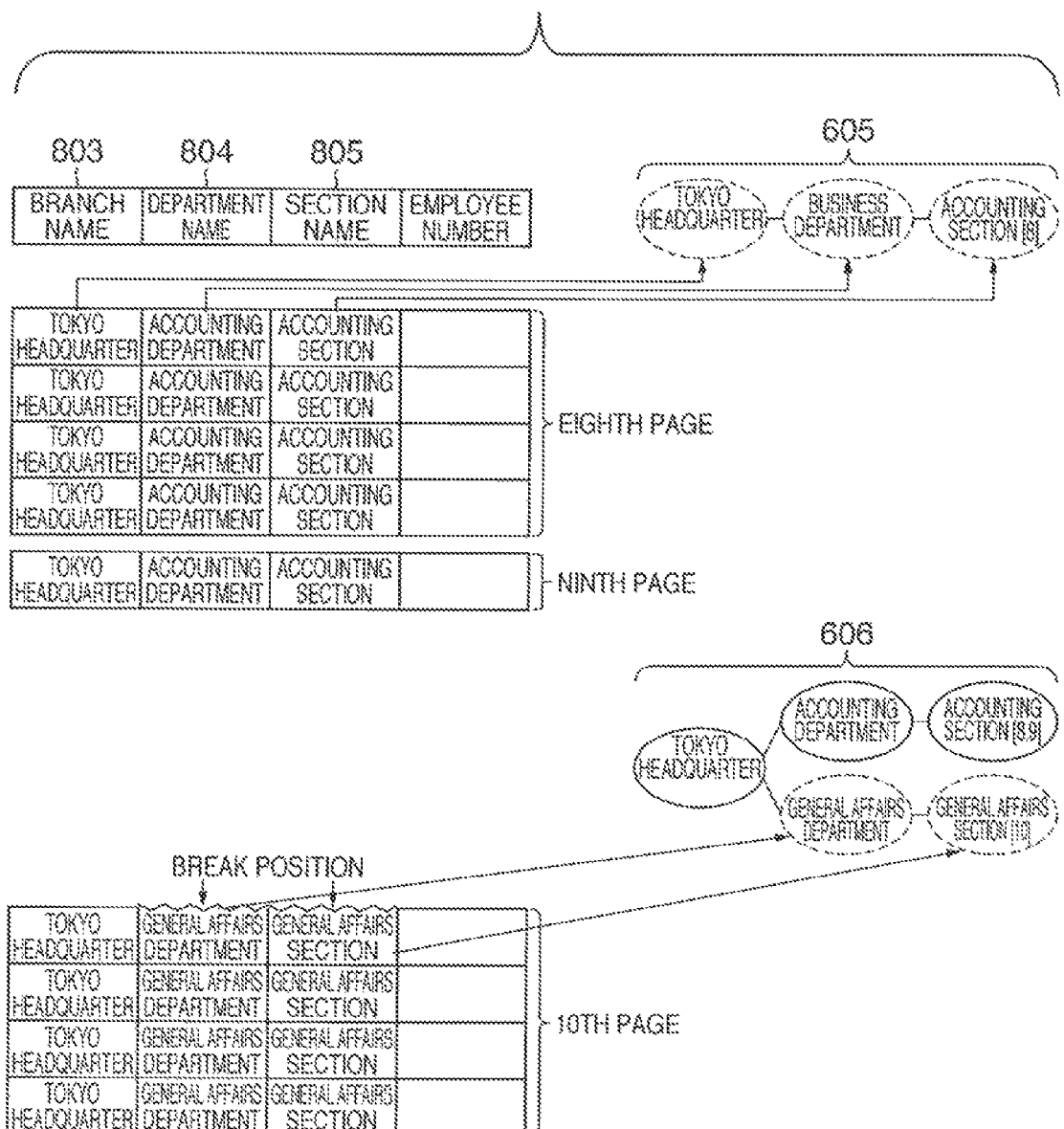
FIG. 7 is a view showing a tree view that indicates a break position search result in exemplified form data.

FIGS. 6 and 7 are views showing a tree view that indicates a break position search result in exemplified form data.

It is possible to designate, as break keys, field names (in this embodiment, e.g., "branch name", "department name" and "section name", and "employee number") contained in form data. Record data indicates a value (in this embodiment, e.g., "business department" and "Osaka branch") stored in each field of the form. "A break occurs" indicates that a change occurs in continuous record data stored in a specific field column. FIG. 6 illustrates a state of break occurrence. The field 804 "department name" stores "business department" as continuous record data and "planning department" as another continuous record data. The continuous data "business department" and "planning department" have a break therebetween. This is called a "break".

Referring to FIG. 6, reference numeral 601 indicates the search result of the first record of the first page of the form data. In this example, "branch name", "department name", and "section name" are designated as the designated field positions. The user can input break positions from the break key designation fields (803 to 805) in the window shown in FIG. 8. Break key 1 (803), break key 2 (804), and break key 3 (805) may be set in the form information (401) contained in the form data.

Reference numeral 602 indicates the search result of the first record of the third page of the form data. In this example, "section name" is designated as the designated field position (break position).

The break search unit 112 searches for the correspondence between the form data and the break position to reveal that (second section) corresponds to a node of field data corresponding to break key 3 (805) designating "section name".

On the basis of this correspondence, the tree display unit 113 creates a tree view 602 to add (second section) as a child node of the node (business department).

The child node (first section) of the field data saves page numbers [1] and [2]. The child node (second section) corresponding to break key 3 (805) saves page number [3].

Reference numeral 603 indicates the search result of the first record of the fifth page of the form data. In this example, "department name" and "section name" are designated as the designated field positions (break positions).

The break search unit 112 searches for the correspondence between the form data and each break position to reveal that (planning department) corresponds to a node of field data corresponding to break key 2 (804) designating "department name". As the child node of (planning department), (first section) corresponds to a node of field data corresponding to break key 3 (805) designating "section name". Based on these correspondences, the tree display unit 113 creates a tree view 603 to add (planning department) as a child node of the node (Osaka branch) and (first section) as a child node of the node (planning department).

The child node (first section) of the (business department) saves page numbers [1] and [2], and the child node (second section) saves page numbers [3] and [4]. The child node (first section) of the node (planning department) saves page number [5].

Reference numeral 604 indicates the search result of the first record of the seventh page of the form data. In this example, "section name" is designated as the designated field position (break position).

The break search unit 112 searches for the correspondence between the form data and the break position to reveal that, as a child node of the node (planning department), (second section) corresponds to a node of field data corresponding to break key 3 (805) designating "section name". On the basis of this correspondence, the tree display unit 113 creates a tree view 604 to add (second section) as a child node of the node (planning department).

The child node (first section) of the node (business department) saves page numbers [1] and [2], and the child node (second section) saves page numbers [3] and [4]. The child node (first section) of the node (planning department) saves page numbers [5] and [6], and the child node (second section) saves page number [7].

Reference numeral 605 in FIG. 7 indicates the search result of the first record of the eighth page of the form data. In this example, "branch name", "department name", and "section name" are designated as the designated field positions.

Reference numeral 606 indicates the processing result of the first record of the 10th page. In this example, "department name" and "section name" are designated as the designated field positions.

The break search unit 112 searches for the correspondence between the form data and each break position to reveal that (general affairs department) corresponds to a node of field data corresponding to break key 2 (804). As a child node of the node (general affairs department), (general affairs section) corresponds to a node of field data corresponding to break key 3 (805). On the basis of these correspondences, the tree display unit 113 creates a tree view 606 to add (general affairs department) as a child node of the node (Tokyo headquarter) and (general affairs section) as a child node of the node (general affairs department).

The child node (accounting section) of the node (accounting department) saves page numbers [8] and [9]. The child node (general affairs section) of the node (general affairs department) saves page number [10].

In this example, the tree display unit 113 displays the tree view 604 in FIG. 6 and the tree view 606 in FIG. 7 in a region 807 in FIG. 8 as the final search result.

(Preview Display)

FIG. 8 is a view illustrating a preview display window displayed on the screen of the client terminal 110 by the preview display unit 111 in the processing in step S302 of FIG. 3.

A display region 802 displays a form data preview window. Reference numeral 801 denotes a search region for preview-displayed form data. The break key designation fields 803 to 805 are used to designate field positions (break positions) as a search target. An operation portion 806 instructs to start search. When the user selects the search start operation portion 806, the break search unit 112 searches the form data for data corresponding to each field position (break position) designated in the break key designation fields (803 to 805). The tree display unit 113 displays a tree view as the search result in the region 807.

FIGS. 9A and 9B are views illustrating a break position search result. The branch name 803, department name 804, and section name 805 are designated as break keys.

The break search unit 112 of the client terminal 110 searches for the field data designated as the break keys. The tree display unit 113 displays the search result as a tree view. The region 807 in FIG. 9A shows the resultant field data as a tree view.

The tree view 604 in the region 807 shown in FIG. 9A is based on the field data search result described with reference to FIG. 6, and the tree view 606 is based on the field data search result described with reference to FIG. 7.

The user can select a node as a print or preview display target in the tree view by using the keyboard or mouse input unit (26 or 27). The tree view 604 in FIG. 9A indicates an example wherein the child node (first section) of the node (business department) is selected.

Displaying a search result as a tree view (hierarchical structure) improves search result recognizability.

When the user selects a node in the tree view shown in FIGS. 9A and 9B, the preview display unit 111 displays an operation menu to process the selected node. Reference numeral 901 indicates a display example of the operation menu displayed by the preview display unit 111 when the user selects a node in the tree view displayed in the region 807. The user can select, from the operation menu 901, three operations, i.e., "print", "preview first page", and "preview last page".

The steps of each processing selected from the operation menu 901 will be described next.

(Print Request Processing)

Figure 10:
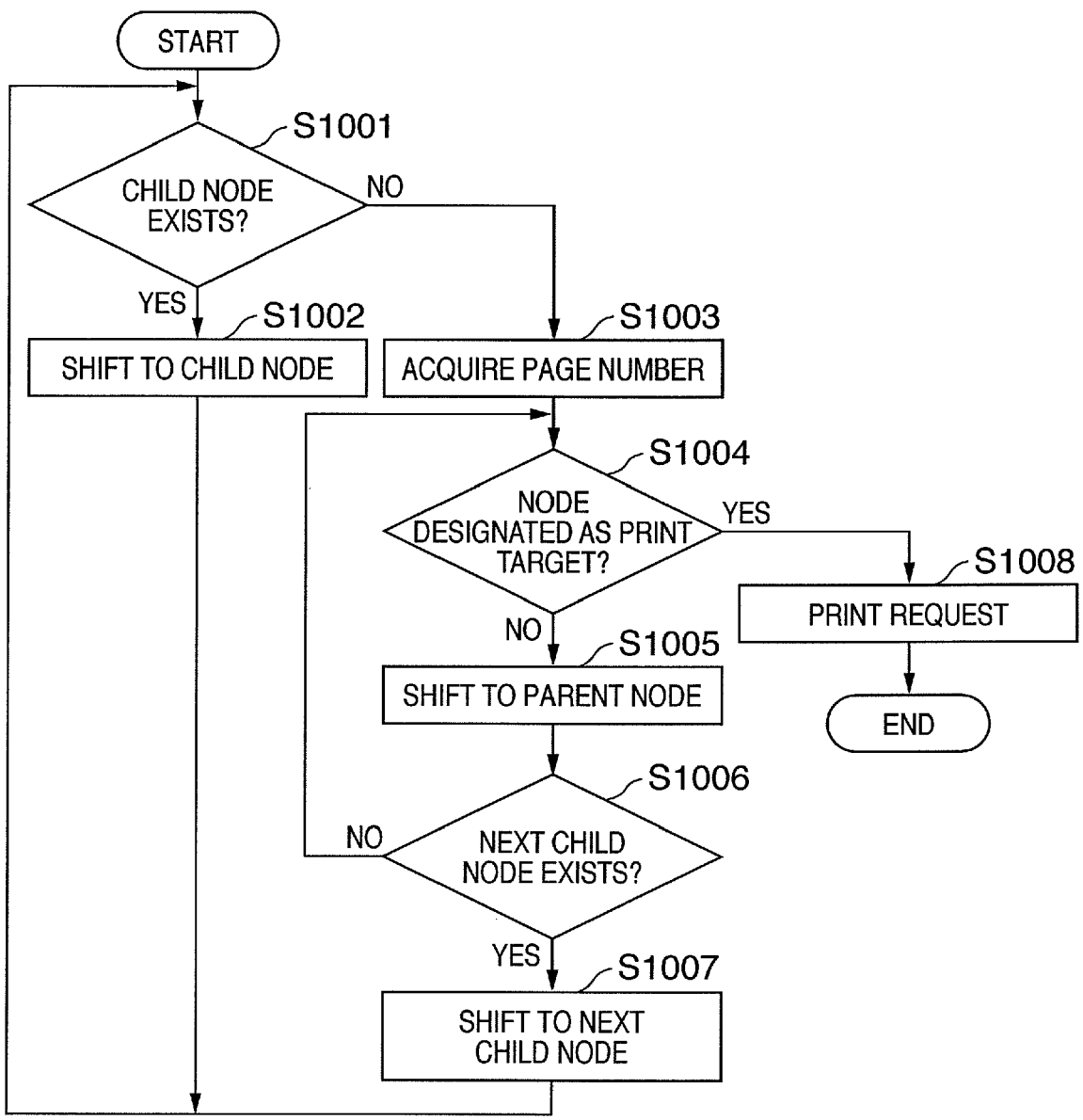
FIG. 10 is a flowchart for explaining the steps of processing when the user designates "print" in the operation menu shown in FIG. 9B.

FIG. 10 is a flowchart for explaining the steps of processing when the user selects "print" in the operation menu shown in FIG. 9B. This processing corresponds to print request execution processing (YES in step S305) in step S305 of FIG. 3. This processing is executed under the control of the CPU of the client terminal 110.

In step S1001, it is determined whether the current node (the node on the most upstream side of the tree in the initial state (e.g., (Osaka branch) of the tree view 601 in FIG. 6) or a node as the target of a user's print instruction) has a child node.

If it is determined in step S1001 that a child node exists (YES in step S1001), the processing shifts to an appropriate child node (S1002), and the processing returns to step S1001.

In step S1001, it is determined whether another child node is set for the child node. If another child node is set, the processing advances to step S1002 to repeat the same processing as described above.

If it is determined in step S1001 that no child node exists (NO in step S1001), page numbers saved in the current node are acquired in step S1003.

In step S1004, it is determined whether the current node is the target of a user's print instruction. If the current node is the target of a print request input by a user instruction (YES in step S1004), the processing advances to step S1008 to transmit the print request with the designation of the page number acquired in step S1003 to the form saving server 120 (S1008). The processing is thus completed.

If it is determined in step S1004 that the current node is not the target of the user's print instruction (NO in step S1004), the processing shifts to the parent node (S1005). It is determined whether the parent node has the next child node (S1006).

For example, if no print setting is done for the child node (first section) of the parent node (planning department) in the tree view 604 shown in FIG. 9A (NO in step S1004), the processing shifts to the parent node (planning department) in step S1005. It is then determined whether the parent node (planning department) has the next child node (S1006).

If it is determined in step S1006 that the next child node exists (YES in step S1006), the processing shifts to the next child node (S1007), and the processing returns to step S1001. For example, in the tree view 604 shown in FIG. 9A, the next child node (second section) is set for the parent node (planning department). For this reason, the processing from step S1001 is executed for the child node (second section).

That is, when the processing returns to step S1001, it is determined whether another child node is set for the child node processed in step S1007. If no child node is set (NO in step S1001), page numbers are acquired in step S1003. If the child node is the print target (YES in step S1004), a print request with the designation of the page number acquired is transmitted to the form saving server 120 (S1008). The processing is thus completed.

For example, if the user selects the child node (first section) of the node (planning department) of the tree view 604 shown in FIG. 9A and selects "print", page numbers [5] and [6] saved in the child node (first section) are acquired (S1003). In the print request transmission in step S1008, a print request with the designation of page numbers [5] and [6] is transmitted to the form saving server 120. The processing on the side of the client terminal 110 is thus completed.

If it is determined in step S1006 that no next child node exists (NO in step S1006), the processing returns to step S1004.

In step S1004, it is determined whether the parent node processed in step S1005 is designated as the print target. If the parent node is the print target (YES in step S1004), the processing advances to step S1008. A print request with the designation of the page number acquired in step S1003 is generated and transmitted to the form saving server 120 (S1008). If the parent node is the print target, the print target includes all child nodes linked to the parent node.

For example, if the parent node (planning department) of the tree view 604 shown in FIG. 9A is designated as the print target, the print target includes [5] and [6] pages saved in the child node (first section) and [7] page saved in the child node (second section).

With the above-described processing, the user can set, as a print range, all pages in form data corresponding to a selected node. This improves operability in print range setting.

(Preview Display of First Page)

Figure 11:
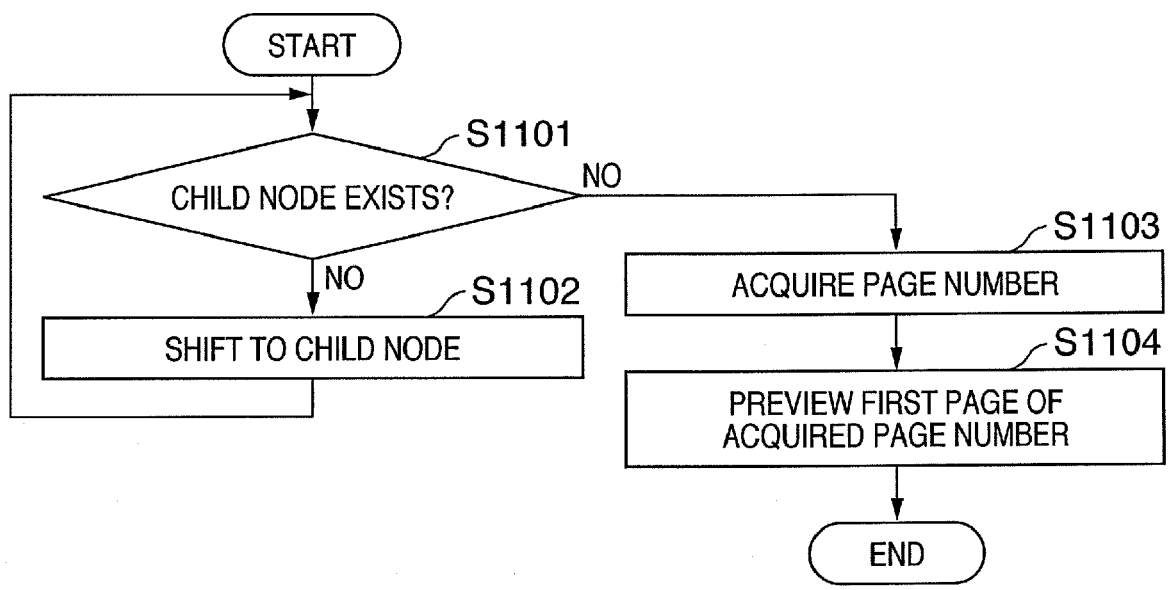
FIG. 11 is a flowchart for explaining the steps of processing when the user designates "preview first page" in the operation menu shown in FIG. 9B.

FIG. 11 is a flowchart for explaining the steps for processing when the user instructs "preview first page" in the operation menu 901 shown in FIG. 9B. This processing corresponds to "preview first page" in step S310 of FIG. 3. This processing is executed under the control of the CPU of the client terminal 110.

In step S1101, it is determined whether the current node (the node on the most upstream side of the tree in the initial state (e.g., (Osaka branch) of the tree view 601 in FIG. 6) or a node as the target of a user instruction) has a child node.

If it is determined in step S1101 that a child node exists (YES in step S1101), the processing shifts to an appropriate child node (S1102), and the processing returns to step S1101. In step S1101, it is determined whether another child node is set for the child node. If another child node is set, the processing advances to step S1102 to repeat the same processing as described above.

If it is determined in step S1101 that no child node exists (NO in step S1101), page numbers saved in the current node are acquired in step S1103.

In step S1104, the preview display unit 111 displays, in the display region 802, the preview of the first page of the page numbers acquired in step S1103. The processing is thus completed.

For example, when the user selects the node (planning department) of the tree view 604 in FIG. 9A and selects "preview first page", page numbers [5] and [6] saved in the child node (first section) are acquired (S1103). The fifth page at the top is preview-displayed in step S1104.

(Preview Display of Last Page)

Figure 12:
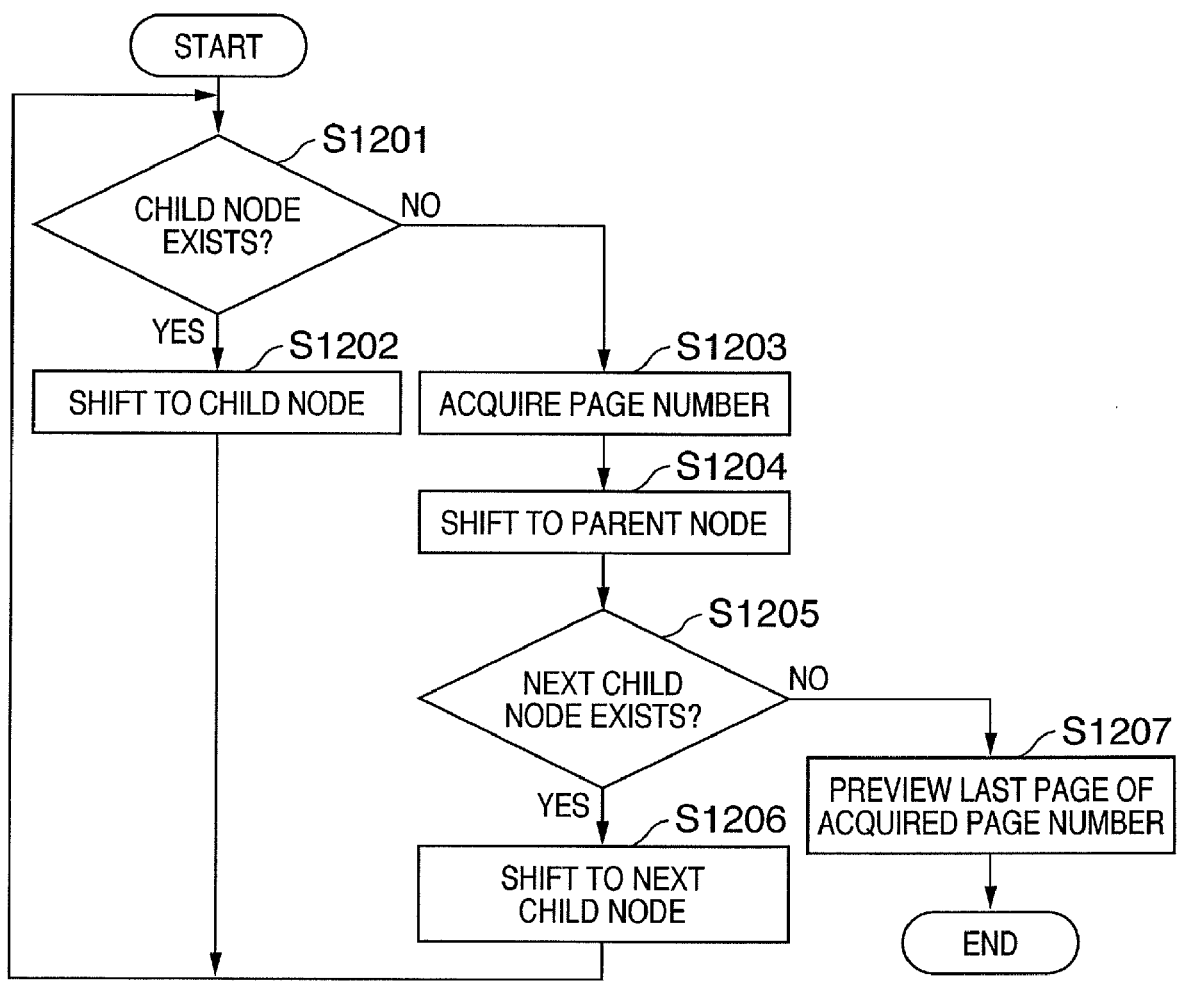
FIG. 12 is a flowchart for explaining the steps of processing when the user designates "preview last page" in the operation menu shown in FIG. 9B.

FIG. 12 is a flowchart for explaining the steps of processing when the user instructs "preview last page" in the operation menu 901 shown in FIG. 9B. This processing corresponds to "preview last page" in step S310 of FIG. 3.

In step S1201, it is determined whether the current node (the node on the most upstream side of the tree in the initial state (e.g., (Osaka branch) of the tree view 601 in FIG. 6) or a node as the target of a user instruction) has a child node.

If it is determined in step S1201 that a child node exists (YES in step S1201), the processing shifts to an appropriate child node (S1202), and the processing returns to step S1201. In step S1201, it is determined whether another child node is set for the child node. If another child node is set, the processing advances to step S1202 to repeat the same processing as described above.

If it is determined in step S1201 that no child node exists (NO in step S1201), page numbers saved in the current node are acquired in step S1203.

In step S1204, the processing shifts to the parent node. In step S1205, it is determined whether the parent node has the next child node (S1205).

For example, in the tree view 604 shown in FIG. 9A, page numbers saved in the child node (first section) of the node (planning department) are acquired (S1203). In step S1204, the processing shifts to the parent node (planning department). It is then determined whether the parent node (planning department) has the next child node (S1205).

If it is determined in step S1205 that the next child node exists (YES in step S1205), the processing shifts to the next child node (S1206), and the processing returns to step S1201. For example, in the tree view 604 shown in FIG. 9A, the next child node (second section) is set for the parent node (planning department). For this reason, the processing from step S1201 is executed for the child node (second section).

That is, when the processing returns to step S1201, it is determined whether another child node is set for the child node processed in step S1206. If another child node is set (YES in step S1201), the processing advances to step S1202 to shift the processing to an appropriate child node (S1202). The processing returns to step S1201. In step S1201, it is determined whether another child node is set for the child node. If another child node is set, the processing advances to step S1202 to repeat the same processing as described above.

If no child node is set (NO in step S1201), the processing advances to step S1203 to acquire the page numbers saved in the child node.

The processing shifts to the parent node (S1204). If no next child node exists (NO in step S1205), the processing advances to step S1207. In step S1207, the preview display unit 111 displays, in the display region 802, the preview of the last page of the page numbers acquired in step S1203. The processing is thus completed.

For example, when the user selects the node (planning department) of the tree view 604 in FIG. 9A and instructs "preview last page", page number [7] saved in the child node (second section) is acquired (S1203). Preview display is done in step S1207 on the basis of this page number.

With the above-described processing, the user can acquire page information in form data corresponding to a selected node, search for form data corresponding to the first page or last page, and easily preview-display it. This improves the recognizability of a search result.

In this embodiment, the user can designate three break keys to search for break positions. However, the present invention is not limited to this. The number of break keys the user can designate may be changed.

Break key designation by the user is not a necessary condition of the present invention. Form information contained in form data may have preset break keys. The form saving server 120 can set break keys together with form information.

As described above, this embodiment can provide an information processing technique capable of searching for desired preview data and print data by an operation with excellent operability in print range setting and excellent search result recognizability.

Other Embodiment

The object of the present invention is also achieved by supplying a storage medium which records software program codes to implement the functions of the above-described embodiment to a system or apparatus. The object of the present invention is achieved by causing the computer (or CPU or MPU) of the system or apparatus to read out and execute the program codes stored in the storage medium.

In this case, the program codes read out from the storage medium themselves implement the functions of the above-described embodiment. The storage medium that stores the program codes constitutes the present invention.

Examples of the storage medium to supply the program codes are a flexible disk, hard disk, optical disk, magnetooptical disk, CD-ROM, CD-R, nonvolatile memory card, and ROM.

The functions of the above-described embodiment are implemented by causing the computer to execute the readout program codes. The present invention also incorporates the following arrangement in which the OS (Operating System) running on the computer wholly or partially executes actual processing on the basis of the instructions of the program codes, thereby implementing the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-352335, filed Dec. 6, 2005, which is hereby incorporated by reference herein in its entirety.

What is claimed is:

1. An information processing apparatus for generating, on the basis of form data which contains a plurality of record data associated with respective fields, print data to be processed by a printing apparatus, comprising:

an input unit adapted to input, via a display window, a plurality of pieces of field identification information for identifying each field, wherein each field corresponds to one of the plurality of pieces of field identification information input by said input unit;

a detection unit adapted to detect a change of at least one of the plurality of record data contained in the form data;

a first display unit adapted to display, on the display window, a tree view that contains the record data before the change detected by said detection unit and the record data after the change detected by said detection unit as nodes of a same layer;

a selection unit adapted to select a node from the tree view displayed by said first display unit;

an acquisition unit adapted to acquire, from the form data, data corresponding to the node selected by said selection unit;

a second display unit adapted to display, on the display window, (i) a preview-display designation portion for designating a preview-display of the data acquired by said acquisition unit, and (ii) a print designation portion for designating an execution of a print process using the data acquired by said acquisition unit; and an image forming unit adapted to execute (i) the preview-display of the data acquired by said acquisition unit, or (ii) the print process using the data acquired by said acquisition unit, in accordance with a designation input from the preview-display designation portion or the print designation portion, wherein said acquisition unit is adapted to acquire, from the form data, page information in the data corresponding to the node selected by said selection unit, and wherein the apparatus further comprises a print data generation unit adapted to generate print data in a print range specified on the basis of the page information acquired by said acquisition unit.

2. The apparatus according to claim 1, further comprising a preview display unit adapted to preview-display the specific data corresponding to one of a first page and a last page of the selected node on the basis of the page information acquired by said acquisition unit.

3. The apparatus according to claim 1, wherein said print data generation unit is adapted to generate the print data by superimposing form information and field data contained in the specific data in the print range of the data specified on the basis of the page information acquired by said acquisition unit.

4. The apparatus according to claim 1, further comprising a specifying unit adapted to specify a field in which a break instruction is set, wherein said first display unit is adapted to display the tree view that contains the record data before change and the record data after change as nodes of the same layer when the record data in the field specified by said specifying unit changes.

5. The apparatus according to claim 1, wherein the specific data contains field data and form information that defines a field data layout method.

6. The apparatus according to claim 1, wherein record data in different field columns of the specific data are laid out in different layers.

7. The apparatus according to claim 1,
wherein the form data includes a plurality of sets of print range data each corresponding to a child node in the tree view,
wherein each set of print range data indicates a subset of pages of a form-data document to be printed, and
wherein the subsets of pages collectively represent all of the pages of the form-data document to be printed.

8. An information processing method of generating, on the basis of form data which contains a plurality of record data associated with respective fields, print data to be processed by a printing apparatus, comprising:
an input step of inputting, via a display window, a plurality of pieces of field identification information for identifying each field, wherein each field corresponds to one of the plurality of pieces of field identification information input in said input step;
a detection step of detecting a change of at least one of the plurality of record data contained in the form data;
a first display step of displaying, on the display window, a tree view that contains the record data before the change detected in said detection step and the record data after the change detected in said detection step as nodes of a same layer;
a selection step of selecting a node from the tree view displayed in said first display step;
an acquisition step of acquiring data, from the form data, corresponding to the node selected in said selection step;
a second display step of displaying, on the display window, (i) a preview-display designation portion for designating a preview-display of the data acquired in said acquisition step, and (ii) a print designation portion for designating an execution of a print process using the data acquired in said acquisition step; and
an image forming step of executing (i) the preview-display of the data acquired in said acquisition step, or (ii) the print process using the data acquired in said acquisition step, in accordance with a designation input from the preview-display designation portion or the print designation portion,
wherein in the acquisition step, page information in the data corresponding to the node selected in said selection step is acquired from the form data, and
wherein the method further comprises a print data generation step of generating print data in a print range specified on the basis of the page information acquired in the acquisition step.

9. The method according to claim 8, further comprising a preview display step of preview-displaying the specific data corresponding to one of a first page and a last page of the selected node on the basis of the page information acquired in the acquisition step.

10. The method according to claim 8, wherein in the print data generation step, the print data is generated by superimposing form information and field data contained in the specific data in the print range of the data specified on the basis of the page information acquired in the acquisition step.

11. The method according to claim 8, further comprising a specifying step of specifying a field in which a break instruction is set,
wherein in the first display step, the tree view that contains the record data before change and the record data after change as nodes of the same layer is displayed when the record data in the field specified in the specifying step changes.

12. The method according to claim 8, wherein the specific data contains field data and form information that defines a field data layout method.

13. The method according to claim 8, wherein record data in different field columns of the specific data are laid out in different layers.

14. The method according to claim 8,
wherein the form data includes a plurality of sets of print range data each corresponding to a child node in the tree view,
wherein each set of print range data indicates a subset of pages of a form-data document to be printed, and
wherein the subsets of pages collectively represent all of the pages of the form-data document to be printed.

15. A non-transitory computer-readable storage medium which stores a control program that, when executed by a computer, causes the computer to execute an information processing method of generating, on the basis of form data which contains a plurality of record data associated with respective fields, print data to be processed by a printing apparatus, the method comprising:
an input step of inputting, via a display window, a plurality of pieces of field identification information for identifying each field, wherein each field corresponds to one of the plurality of pieces of field identification information input in said input step;
a detection step of detecting a change of at least one of the plurality of record data contained in the form data;
a first display step of displaying, on the display window, a tree view that contains the record data before the change detected in said detection step and the record data after the change detected in said detection step as nodes of a same layer;
a selection step of selecting a node from the tree view displayed in said first display step;
an acquisition step of acquiring data, from the form data, corresponding to the node selected in said selection step;
a second display step of displaying, on the display window, (i) a preview-display designation portion for designating a preview-display of the data acquired in said acquisition step, and (ii) a print designation portion for designating an execution of a print process using the data acquired in said acquisition step; and
an image forming step of executing (i) the preview-display of the data acquired in said acquisition step, or (ii) the print process using the data acquired in said acquisition step, in accordance with a designation input from the preview-display designation portion or the print designation portion,
wherein in the acquisition step, page information in the data corresponding to the node selected in said selection step is acquired from the form data, and
wherein the method further comprises a print data generation step of generating print data in a print range specified on the basis of the page information acquired in the acquisition step.

16. The non-transitory computer-readable storage medium according to claim 15, wherein the form data includes a plurality of sets of print range data each corresponding to a child node in the tree view, wherein each set of print range data indicates a subset of pages of a form-data document to be printed, and wherein the subsets of pages collectively represent all of the pages of the form-data document to be printed.

* * * * *